Patented June 15, 1954

2,681,327

UNITED STATES PATENT OFFICE 2,681,327

METHOD OF ELASTICIZING PLASTIC CARBOXYL-CONTAINING SYNTHETIC POLYMERIC RUBBERY MATERIALS AND ELASTIC PRODUCTS PRODUCED THEREBY

Harold P. Brown, Akron, Ohio, assignor to The B. F. Goodrich Company, New York, N. Y., a corporation of New York No Drawing. Application July 25, 1951, Serial No. 238,578

16 Claims. (Cl. 260—41.5)

The present invention relates generally to synthetic rubbery compositions and a method of making same and in particular to a method of producing elastic synthetic rubber compositions having new and improved properties such as greatly superior tensile strength, low temperature flexibility, resistance to ozone, retention of stress-strain properties at elevated temperatures and ability to withstand strong aqueous solutions of alkali and inorganic acids.

In my copending application Serial No. 188,651, filed October 5, 1950, I have disclosed that elastic synthetic rubbery materials of the above and other novel properties and great utility are produced by adding a polyvalent metal oxide to a plastic carboxyl-containing rubbery polymeric material and then heating or "curing" at temperatures of 125 to 400° F. so as to bring about the elasticization of the plastic, carboxyl-containing rubbery polymer. It is pointed out therein that the elastic rubbery products are polymeric metallo-carboxylates formed by a polymeric condensation or salt formation reaction between the polyvalent metallic cation of the metal oxide and the combined (or polymeric) carboxyl (—COOH) groups. This reaction sometimes will be referred to herein as an "elasto-condensation."

It has been noted, however, that the salt formation reaction by which such polymeric metallo-carboxylates are formed is an extremely rapid one and often is very erratic with the result that a molded specimen, for example, does not flow sufficiently to fill the mold completely and the final cured product through strong and fully cured, will be wrinkled, distorted, and somewhat shrunken after being removed from the mold. The reaction occurs so readily that sometimes the mixture of plastic carboxyl-containing rubbery material and polyvalent metal oxide will cure-up or become somewhat stiff or elastic on standing at room temperature and the compositions will frequently "scorch" or precure during milling or other processing operations.

In my copending application Serial No. 197,495, filed November 21, 1950, I have disclosed that addition to the plastic mixture of carboxyl-containing rubber and metal oxide of a carboxylic acid or anhydride thereof has a marked "controller" or retardation effect on the elasto-condensation reaction producing smoother, stronger and less scorchy compositions. However, the carboxylic acid or its polyvalent metal salts migrate or "bloom" to the surface of the rubber composition imparting a greasy feel thereto. Moreover, greatly increased amounts of metallic oxides are required for cure in the presence of the carboxylic controller.

I have now discovered that the polymeric condensation or salt-forming elasto-condensation reaction is efficiently controlled by adding to the carboxyl-containing rubbery material a finely-divided silicon oxide pigment such as any of the fumed, arc, or combustion silicon oxides and finely-divided silica gel precipitates and others. The addition of the silicon oxide pigment eliminates precure during storage of compounded compositions and eliminates the "scorchy" tendencies of the compositions during mixing and processing. The composition containing silicon oxide flows more easily to completely fill a mold, does not become shrunken or distorted when removed from the mold and in the cured or elasticized condition exhibit progressive cure with increasing time so as to have higher tensile strength and modulus and an otherwise more desirable balance of physical properties. In accordance with my discovery the finely-divided silicon oxide is added to the plastic carboxyl-containing rubbery material before, concurrently with, or after the addition of the metal oxide, although the preferred procedure is to add the silicon oxide before, or concurrently with, the incorporation of the metal oxide to prevent scorch. The mixture is then heated at 125 to 400° F. to yield strongly elastic polymeric metallo-carboxylates possessed of the above-described properties.

The improvement in properties resulting from the use of a silicon oxide as a "controller" of the elasto-condenation is manifested in different ways depending on the carboxyl content of the rubbery material. In the polymeric metallo-carboxylates produced from rubbery materials low in combined (polymer-bound) carboxyl (—COOH) groups the effect of the controller is especially marked, manifesting itself principally as a great increase in tensile strength and modulus over that obtained with metal oxide alone. In the polymeric metallo-carboxylates produced from materials high in combined carboxyl content the improvement in properties is equally great and manifests itself in the obtainment of smooth molded specimens free of shrinkage, sometimes in an increase in tensile strength and always as a more desirable balance between the physical properties of tensile strength, modulus of elasticity and ultimate elongation. In every case, the effect of the controller is evident by the greater ease of processing of the raw composition and in the production of smoother, more homogeneous elasticized compositions.

Any of the finely-divided silicon oxides are suitable for use as the controller in the method of this invention. For example, the silicon oxides prepared by the combustion of vapors of silicon halides, silicon ethers, alkyl silicanes, halo-alkyl and halo-aryl silicanes and the like in an atmosphere of oxygen and/or in an electric arc so as to be obtained as fine precipitates on a cool surface having particles ranging from 15 to 25 millimicrons in diameter are especially suitable. Still another method, consisting in heating a mixture of sand and coke in an electric furnace to about 1500° C. and drawing off the silicon vapors evolved into an atmosphere containing oxygen, yields silicon oxides also very suitable for use as a controller. In either of these processes when the atmosphere of oxygen contains an insufficient amount to form the dioxide of silicon a fine precipitate is obtained which has been characterized as silicon monoxide and may consist of a mixture of silicon and silicon dioxide (with perhaps some silicon monoxide) having the average chemical composition of silicon monoxide. A product of the latter type is known as "Monox." Still another method of preparing a finely-divided silicon oxide consists in precipitating from an aqueous alkali silicate solution by careful addition of hydrochloric acid or other strong acid a finely-divided silica gel which when dried is essentially silicon dioxide containing some water of hydration. A product of this type is commercially available and known as "Hysil." Still other methods of preparing finely-divided silicon oxides will readily occur to those skilled in the art.

The amount of silicon oxide utilized does not appear overly critical, although in general improved results are obtained with increasing amounts. Amounts as little as 1 or 2% by weight based on the weight of rubbery carboxyl-containing material show a definite controlling effect on the elasto-condensation reaction and as the amount is increased to 5, 10, 25 or even 50 to 100 parts by weight, the controller effect is more marked and in addition an advantageous filler or reinforcing action is obtained. In general, for efficient "controller" action from 5 to 75% by weight of silicon oxide is preferred.

The metal oxide curing agents for use in the method of this invention are any of the polyvalent metal oxides including those of zinc, magnesium, cadmium, calcium, titanium, aluminum, barium, strontium, copper, cobalt, tin, iron, lead and others. Specifically, zinc oxide, calcium oxide, cadmium oxide (CdO), magnesium oxide (MgO), dibutyl tin oxide [$(C_4H_9)_2$ SnO], lead oxide (PbO), barium oxide (BaO), cobalt oxide ($Co_2O_3$), aluminum oxide ($Al_2O_3$), tin oxide (SnO), strontium oxide and others produce superior results and are preferred. In addition, various polyvalent metal hydroxides (which in reality are hydrated metal oxides which readily give up water either by heat alone or by reaction with a polymeric carboxyl group) such as calcium hydroxide, cadmium hydroxide, zinc hydroxide (which decomposes at 125° C.), barium hydroxide, aluminum hydroxide, and others produce satisfactory salt formation at curing temperatures of 125 to 400° F. Zinc oxide, because it is readily available and in common use in the rubber industry and produces elastic polymeric metallo-carboxylates of excellent properties, is preferred.

The rubbery material used in the formation of elastic polymeric metallo-carboxylates according to this invention is any plastic synthetic polymeric rubbery material comprising predominantly linear carbon chains to which are attached a plurality of free carboxyl (—COOH) groups. One class of rubbery materials of this nature is the plastic polymers of an open-chain aliphatic conjugated diene containing a controlled amount and distribution of combined carboxyl (—COOH) groups. These rubbery materials may be made in many different ways, some of which are disclosed in my copending applications Serial Nos. 193,521, 193,522 and 193,523, all filed November 1, 1950.

For example, as disclosed in Serial No. 193,521, they may be made by the interpolymerization in an acidic aqueous medium of a monomeric mixture comprising (preferably at least 50% by weight) an open-chain aliphatic conjugated diene and an olefinically-unsaturated carboxylic acid.

The open-chain, aliphatic conjugated diene may be any of the butadiene-1,3 hydrocarbons such as butadiene-1,3 itself, 2-methyl butadiene-1,3 (isoprene), 2,3-dimethyl butadiene-1,3, piperylene, 2-neopentyl butadiene-1,3 and other hydrocarbon homologs of butadiene-1,3, or it may be any of the straight-chain conjugated pentadienes or the straight- and branch-chain conjugated hexadienes and others. The butadiene-1,3 hydrocarbons and butadiene-1,3 in particular, because of ability to produce stronger and more desirable polymers are much preferred.

Any olefinically-unsaturated carboxylic acid which polymerizes with a diene to produce rubbery carboxyl-containing polymers and which is characterized by possessing one or more olefinic carbon-to-carbon double bonds and one or more carboxyl (—COOH) groups may be utilized. That is, there may be utilized monocarboxy and polycarboxy, monoolefinic and polyolefinic acids including, for example, such widely divergent materials as acrylic acid, the alpha-alkyl acrylic acids, crotonic acid, beta-acryloxy propionic acid, alpha- and beta-vinyl acrylic acids, alpha-beta-isopropylidene propionic acid, sorbic acid, cinnamic acid, maleic acid, oleic acid, undecylenic acid, ricinoleic acid, linoleic acid, linolenic acid and others.

It is preferred to utilize, as the olefinically-unsaturated acid polymerized with the diene, one or more olefinically-unsaturated carboxylic acids containing at least one activated olefinic carbon-to-carbon double bond, that is, an acid containing an olefinic double bond which readily functions in an addition polymerization reaction because of the double bond being present in the momomer molecule either in the alpha-beta position with respect to the strongly polar carboxyl group thusly

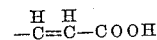

or attached to a strongly reactive terminal methylene grouping thusly $CH_2=C<$.

Illustrative alpha-beta unsaturated carboxylic acids within the just-described preferred class are crotonic acid, alpha-butyl crotonic acid, angelic acid, hydrosorbic acid, cinnamic acid, m-chloro cinnamic acid, p-chloro cinnamic acid, umbellic acid, beta-methyl hydrosorbic acid, and other monoolefinic monocarboxylic acids; sorbic acid, alpha-methyl sorbic acid, alpha-ethyl sorbic acid, alpha-chloro sorbic acid, alpha-bromo sorbic acid, beta-chloro sorbic acid, alpha-, beta-, gamma- or delta-dimethyl sorbic acid, alpha-methyl-gamma-benzal crotonic acid, beta-(2-butenyl) acrylic acid (2,4-heptadiene-oic-1), 2,4-pentadienotic acid, 2,4,6-octatrienoic acid, 2,4,6,8-decatetrienoic acid, 1-carboxy-1-ethyl-4-phenyl butadiene-1,3, 2,6-dimethyl decatriene-(2,6,8)-oic-10, alpha-beta-isopropylidene propionic acid having the structure

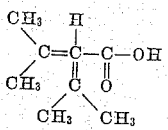

alpha-vinyl cinnamic acid, alpha-isopropenyl-furfuryl acetic acid, alpha - isopropenyl - cinnamenyl acrylic acid and other polyolefinic monocarboxylic acids; maleic acid, fumaric acid, hydromuconic acid, glutaconic acid and other monoolefinic polycarboxylic acids; 3-carboxy-pentadiene-(2,4)-oic-1, muconic acid, and other polyolefinic polycarboxylic acids.

Olefinically-unsaturated carboxylic acids containing the $CH_2=C<$ grouping include acrylic acid, alpha-chloro acrylic acid, alpha-cyano acrylic acid, methacrylic acid, ethacrylic acid, alpha-isopropylidene acrylic acid, alpha-styryl acrylic acid (2-carboxy-4-phenyl butadiene-1,3), beta-vinyl acrylic acid (1-carboxy butadiene-1,3), alpha-vinyl acrylic acid, beta-acryloxy propionic acid, beta-acryloxy acetic acid, and others.

Best results are obtained by interpolymerizing with a diene a monoolefinic monocarboxylic acid in which the double bond is both in alpha-beta position with respect to the carboxyl group and is terminal methylene in structure, such as the acrylic acids including acrylic acid, methacrylic acid, alpha-chloro acrylic acid, ethacrylic acid, and the like and other acids of this structure.

The proportions of diene and acid are not critical as long as a polymer is obtained which is plastic and contains sufficient combined carboxyl as will be hereinafter defined. Particularly valuable rubber-like materials are the interpolymers made from monomeric mixtures containing from 45 to 94% by weight of a butadiene-1,3 hydrocarbon such as butadiene, from 5 to 50% by weight of acrylonitrile and from 1 to 40% by weight of an acid such as methacrylic acid, acrylic acid, sorbic acid or the like. Particularly valuable rubber-like copolymers result from monomeric mixtures of from 70 to 99% by weight of a butadiene hydrocarbon and from 1 to 30% by weight of an acid such as acrylic acid, methacrylic acid, sorbic acid and others.

As mentioned above, the plastic synthetic rubbery carboxyl-containing polymer of an open-chain aliphatic conjugated diene may also be of the type disclosed in my copending application Serial No. 193,522. Such materials are the product of the reaction of a carboxylating agent or carboxyl-supplying reagent such as maleic acid or anhydride, acrylic acid, or a mercapto-substituted carboxylic acid such as thioglycollic acid, beta-mercapto propionic acid or an anhydride thereof, or a material such as an alkali metal or alkaline-earth mono-salt of a dicarboxylic acid such as mono-sodium oxalate, mono-sodium succinate and others, with a plastic polymer of an open-chain aliphatic conjugated diene (preferably a polymer of a butadiene-1,3 hydrocarbon) not containing carboxyl groups, preferably but not necessarily in the presence of a peroxygen catalyst. The result of such reaction is the more or less uniform introduction of carboxyl groups along the diene polymer chain.

Another type of plastic rubbery carboxyl-containing diene polymeric material is disclosed in my copending application, Serial No. 193,523. These materials are produced by the reaction with a hydrolyzing agent of a plastic rubbery interpolymer of an open-chain aliphatic conjugated diene (preferably a butadiene-1,3 hydrocarbon) and an olefinically-unsaturated copolymerizable compound containing a group hydrolyzable to a carboxyl (—COOH) group, such as an unsaturated nitrile (acrylonitrile, for example), ester (an alkyl acrylate or alkacrylate, for example) or amide (acrylamide, for example). The result of the hydrolysis reaction is a plastic, rubbery polymer containing combined carboxyl (—COOH) groups.

Another class of plastic rubbery materials, distinct from the carboxyl-containing diene polymers, but which are composed of predominantly linear carbon chains to which are attached carboxyl groups and are therefore readily converted to strongly elastic, highly useful polymeric metallo-carboxylates according to this invention, are the plastic rubbery polymers of an alkyl ester of an acrylic acid containing combined carboxyl groups. Such materials are produced, as disclosed by the copending application of Earl J. Carlson, Serial No. 197,524, filed November 24, 1950, by copolymerizing in an acidic medium an alkyl ester of an acrylic acid with an olefinically-unsaturated carboxylic acid of the types enumerated above, preferably between 70 to 99% of the ester and 1 to 30% by weight of an acid or they may be produced, as disclosed in my copending application, Serial No. 197,496, also filed November 24, 1950, by partial hydrolysis of a plastic polymer of an alkyl ester of an acrylic acid.

Still another class of plastic rubbery synthetic polymeric materials distinct from any disclosed above, but comprising predominantly linear carbon chains to which are attached carboxyl groups, also utilizable in this invention, are the rubbery interpolymers of a predominant amount (i. e. at least 50% by weight) of an isoolefin such as isobutylene with a subordinate amount of a polymerizable acid chloride such as acrylyl chloride together with, if desired, minor amounts of other substances such as styrene, fulvenes, dienes, etc., which interpolymers have been hydrolyzed to convert the combined acid chloride groups to carboxyl groups. The preparation of such materials is more fully described in my copending application Serial No. 197,497, filed November 24, 1950.

Any other plastic rubbery polymeric material comprising predominantly linear carbon chains to which are attached carboxyl groups, regardless of whether the carboxyl groups are introduced by interpolymerization, by hydrolysis of groups in the polymer chain, by reaction of a rubbery material with a carboxylating agent, or by any other chemical reaction, are utilizable in the elasto-condensation reaction of this invention as carried out with a polyvalent metal oxide and controlled by the presence of finely-divided silicon oxides. It is important, however, that the plastic, synthetic rubbery materials, regardless of how produced, contain a controlled amount of combined carboxyl more or less uniformly distributed over the polymer chains. For the purposes of this invention they should contain from 0.001 to 0.30 chemical equivalents by weight per 100 parts by weight of rubbery material (hereinafter referred to as "equivalents per hundred rubber" and abbreviated e. p. h. r."). Plastic synthetic rubbery materials containing from 0.01 to 0.20 e. p. h. r. of carboxyl when elasticized according to this invention produce elastic polymeric metallo-carboxylates of a predominantly rubbery nature having a good balance of tensile strength, modulus, elongation and hardness while rubbery materials containing 0.01 to 0.10 e. p. h. r. of carboxyl produce polymeric metallo-carboxylates having high strength and good low temperature flexibility.

In the practice of this invention the rubbery material, the polyvalent metal oxide, and the finely-divided silicon oxide are combined into an intimate mixture as by milling or by mastication in an internal mixer such as a Banbury, and the resulting plastic composition is then heated, preferably in a mold under pressure, to a temperature of from 125 to 400° F. until elasticization or curing has occurred. The time of heating will vary somewhat depending on the type of polymer and its carboxyl content, the kind and amount of metal oxide and the kind and amount of finely-divided silicon oxide utilized. Usually, however, a heating or curing cycle of from five minutes to about two hours will be found sufficient. Further heating, however, of a composition containing finely-divided silicon oxide does not appear seriously to degrade the elastic product.

The proportion of polyvalent metal oxide required for efficient elasto-condensation of the compositions of this invention will vary, of course, depending on the carboxyl content of the rubbery material, on the metal oxide itself, its fineness and state of subdivision, and its compatibility with the rubbery carboxyl-containing material and to some extent on the amount of silicon oxide present. While amounts of metal oxide as little as 0.5 part by weight per 100 parts of rubber (abbreviated hereinafter as "p. h. r.") will cause an observable degree of cure of a carboxyl-containing rubber in the presence of silicon oxide, the amount of metal oxide should constitute at least that theoretically required to react with $\frac{1}{10}$ of the polymeric carboxyl groups, and preferably at least one-half. More efficient cure in the presence of silicon oxide is secured with theoretical proportions or more of metal oxide. Increased amounts of metal oxide up to twice or more theoretical amounts seems to favor the formation of stronger products. Excess metal oxide does not seem to be deleterious and functions as a filler only.

The functioning of the combination of polyvalent metal oxide and silicon oxide "controller" is imperfectly understood. One result of the use of the silicon oxide "controller" is to inhibit or retard the curing reaction during shelf storage and mixing and other processing operations (i. e. prevent "scorch"), and to make the composition flow properly during molding and forming operations. However, the presence of silicon oxide does not necessarily lengthen the curing cycle but rather smooths out the reaction and makes cure progressive with time. Another result of its use is to produce smooth, more uniform elastic compositions that do not wrinkle and curl after removal from the mold. However, the striking differences in the physical properties of elastic compositions prepared with the silicon oxide controller as compared to those prepared without it would indicate that it plays an additional role. For example, though the use of silicon oxide results in compositions of generally higher tensile strengths, the outstanding difference is in the sometimes-obtained concurrent increase in ultimate elongation and in compositions which attain very high tensile strengths the increase or reduction in modulus, such that the final composition is "snappier," possesses less permanent set and in general has a better balance of physical properties. The manner in which the silicon oxide controller accomplishes these results is not fully understood but is believed to be the result of either some rearrangement of electrostatic forces between the polymer chains, some other modification of secondary intercrystalline forces, or to be the result of an inter-chain spacing, chain realignment or lubrication.

The invention will now be more fully explained with reference to certain specific examples which shall describe in detail the practice of the invention utilizing various carboxyl-containing rubbery materials, various metallic oxide curing agents and various kinds of silicon oxide controllers.

Example 1

A rubbery copolymer consisting of the interpolymerization product of a monomeric mixture consisting of 94 parts by weight of butadiene-1,3 and 6 parts by weight of sorbic acid or acrylic acid, is prepared by polymerization at 40° C. in an acidic aqueous emulsion having the following composition:

| Material: | Parts/wt. |
|---|---|
| Monomers (to total) | 100.0 |
| Water | 200.0 |
| Dodecylamine (90% neutralized with HCl) | 5.0 |
| t-Dodecyl mercaptan | 0.4 |
| Potassium persulfate | 0.2 |
| Aluminum chloride | 0.2 |

The resultant latex in each case is short-stopped at 75% conversion with 0.2% by weight of hydroquinone and stabilized with 1.5% by weight of phenyl-beta-naphthylamine and then coagulated under acidic conditions to yield a plastic, rubbery copolymer analyzing about 0.04 e. p. h. r. of carboxyl. Separate samples of the sorbic acid copolymer, for example, are sheeted out on the mill and compounding ingredients incorporated therein. One sample thus prepared contains 50 parts by weight per 100 parts of copolymer (p. h. r.) of finely-divided silicon dioxide only, another contains 50 p. h. r. of silicon dioxide and 5 p. h. r. of zinc oxide, and a third contains 50 p. h. r. of an easy-processing channel black and 5 p. h. r. of zinc oxide. The sample containing only silicon dioxide when heated 5 to 40 minutes at 316° F. shows no sign of cure or elasticization while the other two samples containing zinc oxide are converted to tough and strong polymeric metallo-carboxylates. A significant difference in appearance of the latter two is noticeable, however, that containing silicon dioxide being much smoother and entirely free of shrinkage while the carbon black containing metallo-carboxylate is rough, shows signs of poor mold flow and is wrinkled, distorted and considerably shrunken.

Example 2

A copolymer similar to that of Example 1 containing 0.04 e. p. h. r. of (—COOH) is made from a mixture of 94.4% by weight of butadiene and 5.6% by weight of sorbic acid. When separate samples are compounded with 20 p. h. r., respectively, of arc silica, fumed silica, "Monox" silica, and a finely precipitated silica known as "Hysil" and with 6.4 p. h. r., each, of zinc oxide stable compositions are obtained which show no signs of cure on standing at room temperature for several days and when cured at 240° F. optimum physical properties are secured in each case in 80 to 160 minutes. A sample of this copolymer when compounded with 1.4 p. h. r. of zinc oxide and no silica and allowed to stand at room temperature shows definite signs of cure within 24 hours and when cured reaches essentially optimum cure in only 10 to 40 minutes. Polymeric metallo-carboxylates of this copolymer made with silica are in each case smooth and wrinkle-free and have optimum properties of 1500 lbs./sq. in. tensile, modulus at 300% elongation of 1,000 lbs./sq. in., elongation ranging from 300 to 500% and very good low temperature properties and resistance to ozone. Without silica the metallo-carboxylate of this copolymer exhibits roughness and wrinkles and has optimum properties of 610 lbs./sq. in. tensile and elongation of 265%. Thus the effect of silica on this low carboxyl polymer is not only to make the cure progressive with time and form smooth molded products but also seems to greatly improve the physical properties.

*Example 3*

Separate samples of a tripolymer containing 0.10 e. p. h. r. of (—COOH), prepared by the polymerization to 90% conversion in a dodecyl-amine hydrochloride emulsified recipe similar to that of Example 1 of a monomeric mixture consisting of 55% by weight of butadiene-1,3, 35% acrylonitrile and 10% of methacrylic acid or acrylic acid are compounded with 8.38 p. h. r. of zinc oxide each and 20 p. h. r., respectively, of arc silica, fumed silica, "Monox" and "Hysil." The resulting plastic compositions along with a control containing no silica are observed for signs of precure during room temperature aging, none being observed in the silica-containing samples while the silica-free control is definitely cured within 24 hours. The control methacrylic acid tripolymer composition reaches optimum cure in from 10 to 15 minutes at 240° F. at which time it has a tensile strength of about 9000 lbs./sq. in., a modulus at 300% elongation of about 2000 lbs./sq. in. and an elongation of about 600%. The methacrylic acid tripolymer compositions containing the various kinds of silica require 20 to 80 minutes at 240° F. to reach optimum cure at which time they exhibit 7000 lbs./sq. in. tensile strength, modulus of 3000 lbs./sq. in., an elongation of 500%, and are exceedingly resistant to aqueous solutions of acid or alkali, even after boiling for 26 hours with 10% caustic or sulfuric or nitric acid its properties being unchanged. Thus the presence of silica not only "controls" the metallic oxide cure so as to make it progressive with time but also it modifies the physical properties by decreasing the extremely high tensile strength and increasing the low modulus characteristic of the polymeric metallo-carboxylates prepared from this type of tripolymer. The latter aspect of the silica controller is not a pigmentation effect because an equivalent volume of carbon black (16.5 p. h. r) does not so modify the physical properties. Each polymeric metallo-carboxylate prepared with a silica controller is observed upon removal from the mold to show proper mold flow, to be smooth and wrinkle-free in appearance, and to be free of shrinkage. The polymeric metallo-carboxylate prepared with no silica and that with carbon black show signs of poor mold flow and are rough, wrinkled and shrunken in appearance indicating that the stock had precured during mixing, during standing at room temperature or in the mold before it could be closed.

*Example 4*

Separate samples of a tripolymer containing 0.07 e. p. h. r. of (—COOH) made in a medium similar to that of Example 1 from a monomeric mixture consisting of 94% ethyl acrylate, 3% acrylic acid and 3% methacrylic acid is mill-mixed with 5.7 p. h. r. of zinc oxide and 20 p. h. r. of each of the various kinds of silica shown in Example 2. The uncured compositions containing silica showed no signs of cure when stored at room temperature for several weeks. When cured at 240° F. these compositions are smooth and wrinkle-free and require at least 80 minutes for optimum cure as shown by tensile strengths of 2000 to 2500 lbs./sq. in., 300% moduli of 1200 to 1400 lbs./sq. in., and an elongation of 350 to 500%. Optimum physical properties of a polymeric metallo-carboxylate of this tripolymer prepared without silica and cured at 240° F. are a tensile strength of 1380 lbs./sq. in., a modulus of 1020 lbs./sq. in. and an elongation of 500%. As in the previous examples the polymeric metallo-carboxylates prepared with silica are smooth and free from wrinkles and shrinkage while those made without it often are rough and distorted in appearance.

*Example 5*

Still another rubbery carboxyl-containing material which is efficiently converted to elastic polymeric metallo-carboxylates by the method of this invention is a rubbery copolymer of isobutylene and acrylyl chloride which has been hydrolyzed to convert the acid chloride groups to carboxyl (—COOH) groups. Such a copolymer is made by dissolving a mixture of 56 parts by weight of isobutylene and 18 parts by weight of acrylyl chloride in ethyl chloride and slowly adding the resultant solution to a catalyst solution containing 1.26 gms. of aluminum chloride in 250 gms. of ethyl chloride. The reaction is complete in 10 minutes or less at a temperature of —100° C. The final product containing 0.04 e. p. h. r. of carboxyl when compounded with 2.5 to 5.0 p. h. r. of zinc oxide and 10 to 20 p. h. r. of finely-divided silica shows no signs of precure upon room temperature aging for several weeks and upon press molding at 250° F. is converted to a smooth, strong, elastic polymeric metallo-carboxylate showing no signs of poor mold flow, wrinkles, or shrinkage.

*Example 6*

The previous examples have been concerned with the utilization of rubbery carboxyl-containing materials made by interpolymerization. However, other carboxyl-containing materials may be utilized in the method of this invention. For example, latices made by the polymerization in aqueous emulsion of a mixture consisting of 90% butadiene and 10% of ethyl acrylate or acrylonitrile are hydrolyzed by addition thereto of sodium or potassium hydroxide and heating, the latex acid-coagulated and the coagulum washed and dried to obtain a rubbery carboxyl-containing material. Another material is made by dissolving high molecular weight rubbery polybutadiene in benzene and adding to the resulting solution benzoyl peroxide and thioglycollic acid and precipitating the dissolved carboxylated polymer. The addition to these and other materials of zinc oxide, magnesium oxide, calcium oxide, cadmium oxide, cadmium hydroxide and other polyvalent metal oxides together with 1 to 50% by weight of finely-divided silica and heating the resulting plastic compositions at 310° F. produces smooth, distortion-free polymeric metallo-carboxylates.

Although the invention has been illustrated by the foregoing examples, it is to be understood that the invention is not necessarily limited thereto and that numerous variations and modifications which will be obvious to those skilled in the art are within the spirit and scope of the invention as defined by the appended claims.

I claim:

1. The process which comprises preparing a mixture of (1) a plastic synthetic rubbery polymeric material comprising predominately linear polymer chains to which are attached from 0.001 to 0.30 chemical equivalent by weight of combined carboxyl groups per 100 parts by weight of polymeric material, (2) a polyvalent metallic oxide in amount sufficient to react with at least one-tenth of the carboxyl groups attached to the chains of the rubbery material, and (3) a finely-divided silicon oxide in amount at least one percent by weight based on the weight of the rubbery material, and then heating the resulting plastic composition at a temperature from 125 to 400° F. until said plastic composition has been converted to an elastic polymeric metallo-carboxylate by salt formation between the metallic cation of said metal oxide and the combined carboxyl groups of said plastic polymeric material.

2. The process which comprises preparing a mixture of (1) a plastic synthetic rubbery polymeric material containing from 0.001 to 0.30 chemical equivalent by weight of combined carboxyl groups attached to the polymer chains per 100 parts by weight of rubbery material, said carboxyl containing rubbery polymer being prepared by polymerizing in an acidic aqueous medium a monomer mixture comprising an open-chain aliphatic conjugated diene and an olefinically-unsaturated copolymerizable carboxylic acid, (2) a polyvalent metallic oxide in amount sufficient to react with at least one-half the carboxyl groups present in the polymer, and (3) a finely-divided silicon oxide in amount at least one percent by weight of the rubbery material, and then heating the resulting plastic composition at 125 to 400° F. until said plastic composition has been converted to an elastic polymeric metallo-carboxylate by salt formation between the metallic cation of said metal oxide and the combined carboxyl groups of the plastic rubbery material.

3. The process of claim 2 wherein the monomer mixture comprises a major proportion of butadiene-1,3 and a minor proportion of an alpha-beta-unsaturated monocarboxylic acid characterized by possessing a single terminal methylene $CH_2=C<$ group.

4. The process of claim 3 wherein the alpha-beta-unsaturated monocarboxylic acid is methacrylic acid.

5. The process of claim 3 wherein the alpha-beta-unsaturated monocarboxylic acid is acrylic acid.

6. The process of claim 3 wherein the alpha-beta-unsaturated monocarboxylic acid is sorbic acid.

7. The process of claim 4 wherein the monomer mixture comprises from about 45 to 94% by weight of butadiene-1,3, from 5 to 50% by weight of acrylonitrile and from 1 to 40% by weight of methacrylic acid.

8. The process of claim 5 wherein the monomer mixture comprises from about 45 to 94% by weight of butadiene-1,3, from 5 to 50% by weight of acrylonitrile and 1 to 40% by weight of acrylic acid.

9. The process which comprises preparing a mixture of (1) a plastic synthetic rubbery polymeric material containing from 0.001 to 0.30 chemical equivalent by weight of combined carboxyl groups attached to the polymer chains per 100 parts by weight of rubbery material, said carboxyl containing rubbery polymer being prepared by polymerizing in an acidic aqueous medium a monomer mixture comprising an alkyl acrylate and an olefinically-unsaturated copolymerizable carboxylic acid, (2) a polyvalent metallic oxide in amount sufficient to react with at least one-half of the combined carboxyl groups present in the polymer, and (3) a finely-divided silicon oxide in amount at least one percent by weight of the rubbery material, and then heating the resulting plastic composition at 125 to 400° F. until said plastic composition has been converted to an elastic polymeric metallo-carboxylate by salt formation between the metallic cation of said metal oxide and the combined carboxyl groups of the plastic rubbery material.

10. The process of claim 9 wherein the monomer mixture comprises ethyl acrylate and acrylic acid.

11. The process of claim 10 wherein the monomer mixture comprises ethyl acrylate, acrylic acid and methacrylic acid.

12. The process which comprises preparing a mixture of (1) a plastic synthetic rubbery polymeric material containing from 0.001 to 0.30 chemical equivalent by weight of combined carboxyl groups attached to the polymer chains per 100 parts by weight of rubbery material, said carboxyl-containing rubbery polymer being prepared by polymerizing a monomer mixture comprising acrylyl chloride and at least 50% of isobutylene and hydrolyzing the resulting interpolymer, (2) a polyvalent metallic oxide in amount sufficient to react with at least half the carboxyl groups present in the polymer, and (3) a finely-divided silicon oxide in amount at least one percent by weight of the rubbery material, and then heating the resulting plastic composition at 125 to 400° F. until said plastic composition has been converted to an elastic polymeric metallo-carboxylate by salt formation between the metallic cation of said metal oxide and the combined carboxyl groups of the plastic rubbery material.

13. The process of claim 1 wherein the polyvalent metallic oxide is zinc oxide and the silicon oxide is a finely-divided silica oxide obtained by the precipitation of silicon oxide vapors.

14. An elastic polymeric metallo-carboxylate prepared by the process of claim 1.

15. An elastic polymeric metallo-carboxylate prepared by the process of claim 2.

16. An elastic polymeric metallo-carboxylate prepared by the process of claim 13.

References Cited in the file of this patent
UNITED STATES PATENTS

| Number | Name | Date |
|---|---|---|
| 2,234,204 | Starkweather et al. | Mar. 11, 1941 |
| 2,578,605 | Sears et al. | Dec. 11, 1951 |
| 2,626,248 | Brown | Jan. 20, 1953 |